United States Patent [19]

Hershel

[11] 4,105,289
[45] Aug. 8, 1978

[54] APPARATUS AND METHOD FOR IMAGE SAMPLING

[75] Inventor: Ronald S. Hershel, Tucson, Ariz.

[73] Assignee: University Patents, Inc., Stamford, Conn.

[21] Appl. No.: 681,469

[22] Filed: Apr. 29, 1976

[51] Int. Cl.$^2$ .............................................. G02B 5/18
[52] U.S. Cl. .......................... 350/162 SF; 350/162 R
[58] Field of Search ................... 350/12, 13, 162 SF, 350/162 R, 3.5

[56] References Cited

U.S. PATENT DOCUMENTS

| | | | |
|---|---|---|---|
| 3,529,887 | 9/1970 | Sun Lu | 350/3.5 X |
| 3,540,797 | 11/1970 | Glenn, Jr. | 350/162 SF |
| 3,571,603 | 3/1971 | Bryant et al. | 350/162 SF UX |
| 3,772,976 | 11/1973 | Stroke | 350/12 UX |
| 3,940,788 | 2/1976 | Abe et al. | 350/162 SF X |

OTHER PUBLICATIONS

Rukman et al., "Obtaining Holograms with an Incoherent Light Source," *ZhETF Pis.*, vol. 8, No. 10, Nov. 1968, pp. 538-540.
Bryngdahl, "Optical Map Transformations," *Optics Communications*, vol. 10, No. 2, Feb. 1974, pp. 164-168.

*Primary Examiner*—John K. Corbin
*Assistant Examiner*—John D. Lee
*Attorney, Agent, or Firm*—Martin Novack

[57] ABSTRACT

A method and apparatus for receiving optical radiation representative of a scene and for generating a processed image having periodic spatial amplitude modulations; i.e., a sampled image which does not suffer substantial loss of overall illumination. In accordance with the invention there is provided a means for generating a plurality of ordered images of the scene, at least one of the ordered images being out of phase with respect to the other ordered images. Phase shift means are provided for imparting a phase shift to said at least one ordered image so that it is substantially in phase with respect to the other ordered images. Focusing means are provided for collecting the ordered images to obtain the processed image. In the preferred embodiment of the invention the plurality of ordered images are substantially non-overlapping. In this embodiment, the means for generating a plurality of ordered images includes a phase grating and a lens adjacent the phase grating. Also, in this embodiment the phase shift means comprises a phase retarding plate which is operative to impart a phase shift to the zero order.

46 Claims, 7 Drawing Figures

APPARATUS AND METHOD FOR IMAGE SAMPLING

BACKGROUND OF THE INVENTION

This invention relates to the field of optics and, more particularly, to an optical relay for sampling or concentrating incident light without substantial loss of illumination.

In various optical systems it is desirable to sample a continuous image so that its elemental constituents can be put into discrete form for subsequent processing. A number of image detection and processing equipments would benefit from an efficiently sampled image. For example, there is an increasing availability of a type of solid state image detectors wherein only a portion of each elemental area of detector array is "active," and light incident on inactive portions is effectively wasted. In other applications it is useful to have a number of images share a single image plane, such as a photosensitive surface. For example, "image multiplexing" may involve storing multiple images on a single frame of photographic film, e.g., for color multiplexing on black and white film. Also, optical data processing or analysis may involve the incidence of multiple images on a camera tube.

In any system for image sampling or multiplexing it is desirable to optimize parameters such as resolution and efficiency of light collection, but it is often found that severe tradeoffs exist which compromise the quality of one or more important performance factors. As a simplified illustration, one way to sample an image is by placing a pinhole array over the image so that the light passing through each pinhole is a measure of the image density at the pinhole. In this type of system, the efficiency of light collection is quite poor because most of the light will be blocked by the opaque portion of the pinhole array. One technique for increasing the efficiency of such a system is to increase the size of the pinholes. However, this adversely affects system resolution by introducing uncertainty as to the location of the sampled image values. Both efficiency and resolution of sampled values are substantially improved by interposing a small lens at the position of each enlarged pinhole, thereby effectively converting the array into a "fly's eye" lens array. in such case, each individual lens element or "lenslet" collects light over its entire area and focuses it to a point in the detector plane. One problem with "fly's eye" arrays, however, is that it is difficult to produce lens arrays having elements small enough to sample at the increments required for optical images. Also, as the lenses are made smaller and smaller the requirements for spacing of the optical elements (such as the spacing between lens array and detector) become exceedingly small and impractical.

It is an object of the present invention to provide solution to the prior art problems as set forth.

SUMMARY OF THE INVENTION

The present invention is directed to a method and apparatus for receiving optical radiation representative of a scene and for generating a processed image having periodic spatial amplitude modulations; i.e., a sampled image which does not suffer substantial loss of overall illumination. In accordance with the invention there is provided a means for generating a plurality of ordered images of the scene, at least one of the ordered images being out of phase with respect to the other ordered images. Phase shift means are provided for imparting a phase shift to said at least one ordered image so that it is substantially in phase with respect to the other ordered images. Focusing means are provided for collecting the ordered images to obtain the processed image. In the preferred embodiment of the invention the plurality of ordered images are substantially non-overlapping. In this embodiment, the means for generating a plurality of ordered images includes a phase grating and a lens adjacent the phase grating. Also, in this embodiment the phase shift means comprises a phase retarding plate which is operative to impart a phase shift to the zero order. As will be described, it is desirable that the phase grating have a duty cycle of about 25%.

Applicant has found that the disclosed technique permits the sampling of an image with relatively high resolution and increased signal-to-noise ratio as compared to presently available techniques. The present technique operates such that the "dark" regions of the processed image (which lie adjacent the concentrated sampled regions) have relatively very low irradiance values, and this is particularly beneficial for multiplexing or multiple image storage applications. Also, the technique is operative using incoherent light over a relatively broad spectral range. In a particular application it was found that the disclosed technique is useful in sufficiently concentrating a weak image to obtain meaningful exposure of film area where the original image was generally insufficient to exceed the threshold exposure level of the film. Also, a corresponding enhancement of the sensitivity of photographic film for intense images (or intense portions of an image) which would normally saturate the film is found to occur. Specifically, the attenuation in the regions between concentrated peaks is believed to achieve the observed effect. Thus, enhancement at both ends of the range yield a substantial increase in effective overall dynamic range when employing the invention.

Further features and advantages of the invention will become more readily apparent from the following detailed description when taken in conjunction with the accompanying drawings.

DESCRIPTION OF THE PREFERRED EMBODIMENT

Figure 1:
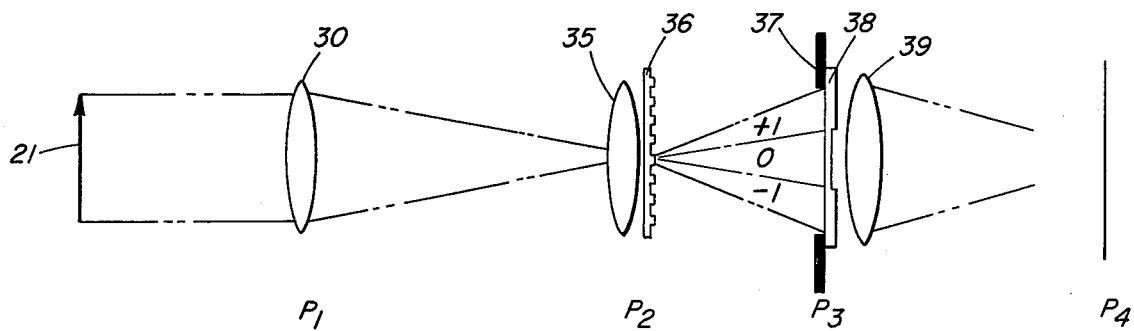
FIG. 1 is a schematic representation of an apparatus in accordance with an embodiment of the invention.

Referring to FIG. 1, there is shown a schematic representation of an apparatus in accordance with the invention. A scene from which the processed image is to be obtained is represented by arrow 21. As used herein, the term "scene" is intended to include any illuminated or illuminating object or image from which the processed image can be obtained. In the present embodiment the object (arrow) 21 can be considered as an object illuminated by incoherent light, although coherent illumination could also be employed. (Also, it will be understood that terms used herein such as "light" or "optical radiation" are intended to include both the visible and the non-visible infrared and ultraviolet.) A lens 30 is located at an entrance pupil plane designated $P_1$ and serves to form an image of the object 21 at a first image plane, designated $P_2$. Located at the plane $P_2$ is a phase grating 36 which, in the present embodiment, and for purposes of illustration, is a one-dimensional periodic array of embossed patterns, to be described further hereinbelow. A lens 35 images the entrance pupil at an exit pupil plane designated $P_3$. In the plane $P_3$ several images of the entrance pupil appear as a result of the diffraction grating. In particular, multiple diffracted orders are produced by the phase grating 36 and, in conjunction therewith, the lens 35 serves to generate a plurality of substantially non-overlapping ordered images of the object at the plane $P_3$.

In the present embodiment an aperture stop 37 is provided at the plane $P_3$ and serves to block the higher diffracted orders so that only the 0, +1, and −1 orders are allowed through. As will be described below, the 0-order is in phase opposition with the +1 and −1-orders. A transparent phase retarding plate 38 is located in the plane $P_3$ and is operative to effect a 180° phase shift of the 0-order with respect to the +1 and −1-orders. This may be achieved, for example, by providing an additional thickness at the areas traversed by the +1 and −1-orders such that they experience a retardation of about a half-wavelength. A lens 39 is also located at about the plane $P_3$ and is operative to image the grating 36 at the plane designated $P_4$ so as to obtain the desired processed image. The processed image is similar in content to the one at the grating (plane $P_2$), but it contains periodic modulation so that, for example, a uniformly illuminated field at plane $P_2$ would result in a series of spaced narrow lines of relatively high intensity interspersed with relatively broad areas of relatively low intensity. In the two-dimensional case the result is a pattern of relatively intense spots on a relatively dark background. This "light concentration", without attendant illumination loss (e.g. occurs for image sampling using an amplitude grating), is particularly useful for various image detection and image multiplexing applications. The media at plane $P_4$ may be, for example, a photographic film or any suitable optical system such as the input to a camera system.

To analyze the operation of the apparatus of FIG. 1 it is useful to employ Fourier transforms, the positive lenses in each plane being positioned such that the Fourier transform relationship exists between adjacent planes.

The pupil coordinate is defined as $$\xi = x/\lambda d, \quad (1)$$

where $x$ is the distance coordinate, $\lambda$ is the wavelength of the light considered, and $d$ is the distance between successive planes. Fourier transform pairs are denoted herein by capital and small letters (e.g., $G_p(\xi) = F\{g_p(x)\}$).

The entrance pupil of the apparatus is irradiated with quasimonochromatic light from an object scene 21. Expressing the instantaneous complex amplitude at a point $\xi = \xi_o$ in the pupil plane $P_1$ as $A(\xi_o)$, the contribution of this point to the primary image plane is $$a(x;\xi_o) = A(\xi_o)e^{i2\pi\xi_o x}. \quad (2)$$

Denoting time averages by the symbol $\langle \rangle_{time}$ and integrating over the entrance pupil, we obtain a corresponding radiance distribution, $$I_o(x) = \langle |\int a(x;\xi_o)d\xi_o|^2 \rangle_{time}. \quad (3)$$

A periodic filter (grating 36) is present at the first image plane, $P_2$. The complex amplitude of the grating is expressed as a convolution of a complex function $g(x)$ with a series of delta functions which are designated as "comb" or "shah" functions, these functions being described in the books entitled *Introduction to Fourier Optics* by J. W. Goodman (McGraw-Hill Book Co., N.Y., 1968) and *The Fourier Transform And Its Applications* by R. Bracewell (McGraw-Hill Book Co., N.Y., 1965).

$$g_p(x) = g(x)*comb(x). \quad (4)$$

The grating period is taken as the unit of distance for $x$. The complex amplitude distribution immediately to the right of the grating 36 is $$a'(x;\xi_o) = A(\xi_o)e^{i2\pi\xi_o x}[g(x) + comb(x)].$$

In the exit pupil plane, $P_3$, the amplitude is given by $$A'(\xi,\xi_o) = A(\xi_o) G(\xi - \xi_o) comb(\xi - \xi_o).$$

The quantity $A'(\xi,\xi_o)$ is filtered with a function $F(\xi)$ located in $P_3$ (wave retarding plate 38). For the filter $F(\xi)$ to have the same effect for all allowed values of $\xi_o$ the following condition is required.

$$F(\xi_o) comb(\xi - \xi_o) = F(\xi - \xi_o) comb(\xi - \xi_o). \quad (5)$$

After filtering we have $$A''(\xi,\xi_o) = A(\xi_o)G(\xi - \xi_o)F(\xi - \xi_o)comb(\xi - \xi_o)$$
$$= A(\xi_o)G'(\xi - \xi_o)comb(\xi - \xi_o) = A(\xi_o)G_p'(\xi - \xi_o), \quad (6)$$

where $$G'(\xi) = G(\xi) F(\xi)$$

and $$G_p'(\xi) = G_p(\xi)F(\xi) = G(\xi)F(\xi) comb(\xi).$$

The complex amplitude distribution in the processed image plane is given by $$a''(x;\xi_o) = A(\xi_o)e^{i2\pi\xi_o x}[comb(x)*g'(x)] = A(\xi_o)e^{i2\pi\xi_o x}[g_p'(x)].$$

From Eqs. (2) and (3), the irradiance distribution in the final plane is given by $$I(x) = I_o(x) |comb(x)*g'(x)|^2. \quad (7)$$

From Eq. (7) it is seen that the first image irradiance is multiplied (modulated) by a periodic function. If the functions $g$ and $F$ are pure phase functions, then theoretically the sampling is achieved with no light loss. However, if a pure amplitude grating were used in $P_2$, transmission of the relay system would depend on the duty cycle of the grating, where the duty cycle is the ratio of the line width to the grating period.

The use of phase gratings produces two separate effects when broadband illumination sources are used: (1) There is a wavelength-dependent phase retardation in both the primary image plane and the exit pupil. Neglecting index changes, phase retardation equals $2\pi(n - 1)t/\lambda$, where $t$ and $n$ are the thickness and refractive index, respectively, of the phase-retarding element. (2) The variables $\xi$ and $\xi_o$ depend on $x$, $x_o$, and $\lambda$ as per Eq. (1). The dispersion of the pupil images in $P_3$ is proportional to $\lambda$.

For phase retardations of $\pi$ and at a mean wavelength $\lambda_o$ in both the grating and the filter, there is a relative insensitivity of system performance to broadband illumination. The effect of dispersion in $P_3$ is compensated if the filter function satisfied Eq. (5) for all wavelengths under consideration. The separation of the multiple images of $P_1$ in $P_3$ is proportional to wavelength. Hence, filtering of any diffracted order without affecting adjacent orders (i.e., substantial non-overlap) places a constraint on the grating period and range of wavelength if Eq. (5) is to be satisfied.

In the embodiment of FIG. 1 only the zero-order image is altered by the filter function. The grating 36 should preferably separate the first and zero orders for the shortest wavelength. In terms of the $f$-number of the primary imaging optics, the above condition is satisfied if grating period $< \lambda_{min}$. ($f$-number).

Figure 2:
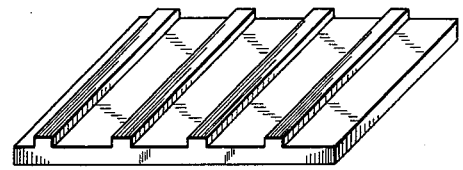
FIG. 2 illustrates a phase grating useful in an embodiment of the invention.
Figure 3:
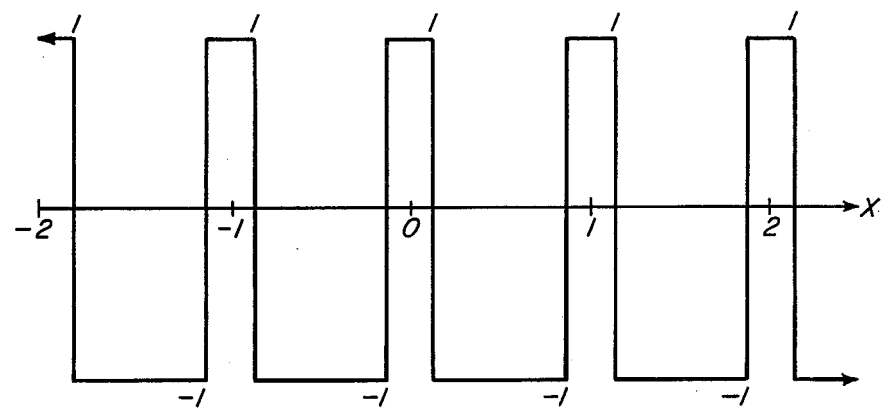
FIG. 3 is a graph illustrating the transmission characteristic of the grating of FIG. 2.

For the one dimensional case of FIG. 1, the phase grating may be of the form illustrated in FIG. 2; i.e. a 25% duty cycle glass phase grating with a relative phase retardation of $\pi$. The transmission of the grating is shown in FIG. 3 and its complex amplitude is $$G_p(x) = 2 \ [\text{rect}(4x)*\text{comb}(x)] - 1. \quad (8)$$

Figure 4:
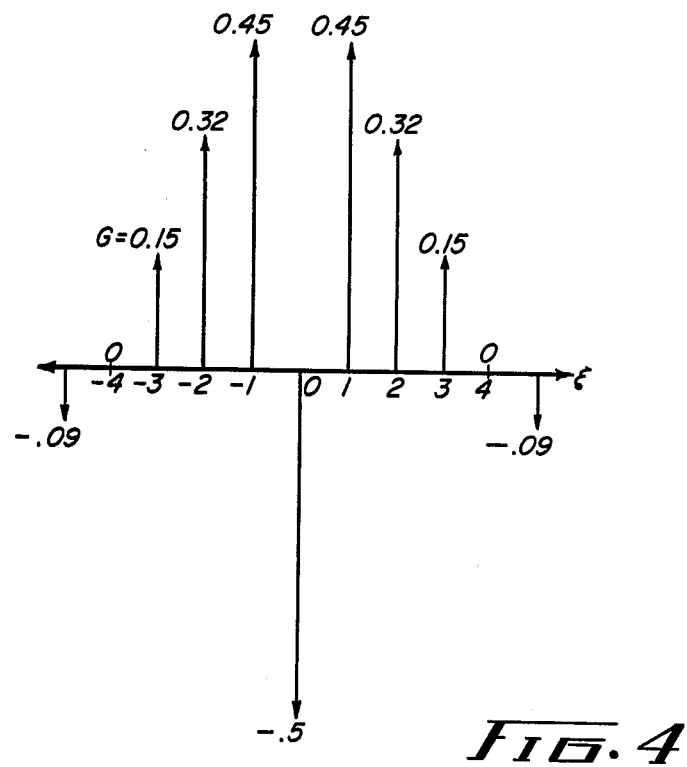
FIG. 4 illustrates the Fourier transform of the characteristic of FIG. 3.

Because of the phase change value of $\pi$, the real and imaginary parts of this function are relatively insensitive to wavelength differences. Transforming Eq. (8) gives $$G_p(\xi) = \tfrac{1}{2} \ \text{sinc} \ (\xi/4) \ . \ \text{comb} \ (\xi) - \delta(\xi),$$

this Fourier transform being shown in FIG. 4. The phase of the zero order is shifted at $P_3$ by $\pi$ by the plate 38 so that $$G_p'(\xi) = \tfrac{1}{2} \ \text{sinc} \ (\xi/4) \ . \ \text{comb} \ (\xi).$$

Transforming again to the processed image plane, $P_4$, we have $$G_p'(x) = 2 \ \text{rect} \ (4x)*\text{comb} \ (x).$$

Thus, the irradiance modulation function is $$M(x) = 4 \ \text{rect} \ (4x)*\text{comb} \ (x).$$

Figure 5:
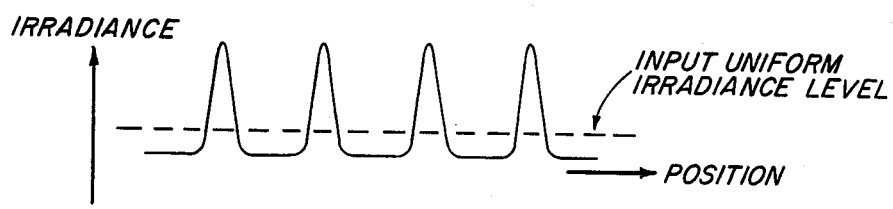
FIG. 5 illustrates the irradiance modulation function obtained from a uniform field using the present invention.

$M(x)$ is illustrated in FIG. 5 where the lines have height 4 and the background is 0. The result is a gain of 4 in irradiance over that obtainable with a binary amplitude grating.

Figure 6:
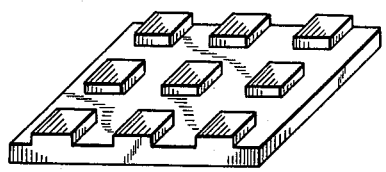
FIG. 6 illustrates a phase grating useful in an embodiment of the invention.

For a two-dimensional embodiment, the grating of FIG. 6 is suitable, although alternate forms can be employed. The complex amplitude in this case is $$G_p(x) = 2 \ [\text{rect}(2x)*\text{comb}(x)] \ [\text{rect}(2y)*\text{comb}(y)] - 1.$$

Transforming the above gives
$$G_p(\xi) = \tfrac{1}{2} \ \text{sinc}(\xi/2)\text{comb}(\xi).\text{sinc}(n/2)\text{comb}(n) - \delta(\xi)\delta(n).$$

In the two-dimensional case the phase of the zero order is reversed using a phase retarding plate to obtain $$G_p'(\xi) = \tfrac{1}{2} \ \text{sinc}(\xi/2)\text{comb}(\xi).\text{sinc}(n/2)\text{comb}(n).$$

The amplitude distribution in the processed image plane $P_4$ becomes $$g_p'(x) = 2 \ [\text{rect}(2x)*\text{comb}(x)] \ . \ [\text{rect}(2y)*\text{comb}(y)].$$

The irradiance modulation function is therefore $$M = 4 \ [\text{rect}(2x)*\text{comb}(x)] \ . \ [\text{rect}(2y)*\text{comb}(y)].$$

Again, a gain of 4 in irradiance over the binary amplitude counterpart is attained.

Figure 7:
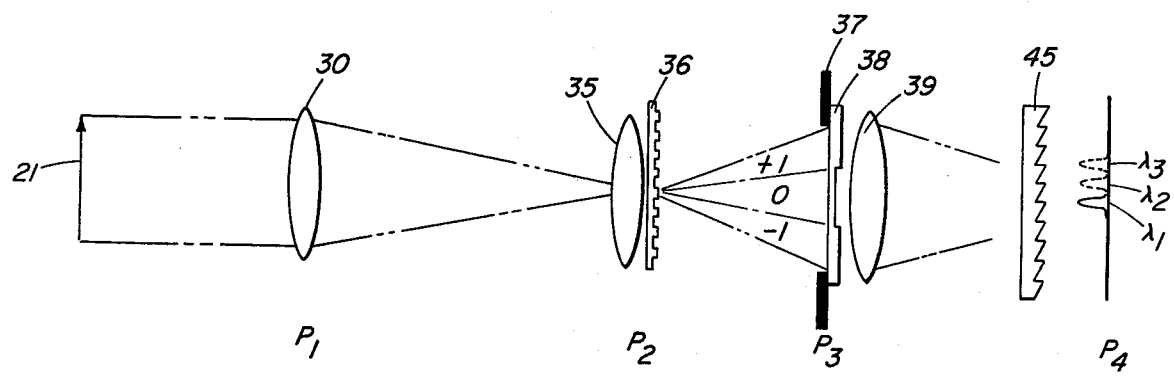
FIG. 7 is a schematic representation of an apparatus in accordance with another embodiment of the invention.

Referring to FIG. 7, there is shown an embodiment of the invention wherein the attained spatial modulation is wavelength-dependent so that, for example, color multiplexing or coding can be achieved. The system of FIG. 7 is similar to that of FIG. 1, except that a dispersion element such as a blazed grating 45 is disposed in the light path, for example between the lens 39 and the processed image plane $P_4$. The groove depth of the grating 45 is matched to the expected range of wavelengths so as to obtain a desired degree of lateral color-dependent displacement at $P_4$. As is known, grating 45 "spreads" the color components of light incident thereon. This effect, combined with the periodic spatial amplitude modulation of the system, as previously described, allows efficient attainment of color multiplexing. For example, different color components of an image, represented in the FIG. by $\lambda_1$, $\lambda_2$, and $\lambda_3$, are displaced by different amounts, so multiple resultant images are color "coded" in accordance with the position at which they appear. This is useful for various applications, for example color-coded recording on monochrome film or use in a single tube color camera. It will be understood that in the embodiment of FIG. 7 the grating 45, or a suitable substitute therefor, could be combined with another optical element in the system. For example, it could be integrated with the phase retarding plate 38.

The invention has been described with reference to particular embodiments, but variations within the spirit and scope of the invention will occur to those skilled in the art. For example, it will be understood that higher diffracted orders, in one or two dimensions, could be collected to obtain the processed image, the embodiment of FIG. 1 being illustrative of one preferred setup which facilitates description of the invention. Also, while the illustrative embodiment is shown using transmissive optics, it should be understood that principles of the invention also apply to a system employing reflective optics.

From the above it can be appreciated that the invention provides particular advantage for image detection or multiplexing at relatively high resolution, and without the limitations encountered with arrays of microlenses. The invention is particularly applicable for use in conjunction with photosensitive arrays having only a portion of their area as active sensors (as is the case for various solid state arrays) since the image can be substantially concentrated on the photosensitive areas without loss of overall light level.

I claim:

1. Apparatus for receiving optical radiation representative of a scene and for generating a processed image having periodic spatial amplitude modulations, comprising:
    means for generating a plurality of ordered images of said scene, at least one of said ordered images being out of phase with respect to other ordered images;
    phase shift means for imparting a phase shift to said at least one ordered image so that it is substantially in phase with respect to said other ordered images; and
    means for collecting said phase shifted ordered image and at least one other ordered image to obtain the processed image.

2. Apparatus as defined by claim 1 wherein said plurality of ordered images are substantially non-overlapping.

3. Apparatus as defined by claim 2 wherein said means for generating a plurality of ordered images comprises a phase grating.

4. Apparatus as defined by claim 3 wherein said phase shift means is operative to impart a phase shift to the zero order.

5. Apparatus as defined by claim 4 wherein said phase shift means imparts a phase shift of about $\pi$ radians.

6. Apparatus as defined by claim 3 wherein said phase grating has a duty cycle of about 25%.

7. Apparatus as defined by claim 3 further comprising means for effecting wavelength-dependent spatial displacement of said optical radiation.

8. Apparatus as defined by claim 7 wherein said means for effecting wavelength-dependent spatial displacement comprises a dispersion element.

9. Apparatus as defined by claim 2 wherein said phase shift means comprises a phase retarding plate.

10. Apparatus as defined by claim 2 further comprising stop means adapted to block predetermined higher ordered images.

11. Apparatus as defined by claim 2 wherein said means for collecting comprises a focusing lens.

12. Apparatus as defined by claim 2 wherein said collecting means is operative to collect said phase shifted ordered image and a plurality of other ordered images.

13. Apparatus as defined by claim 2 further comprising means for effecting wavelength-dependent spatial displacement of said optical radiation.

14. Apparatus as defined by claim 13 wherein said means for effective wavelength-dependent spatial displacement comprises a dispersion element.

15. Apparatus as defined by claim 1 wherein said means for generating a plurality of ordered images comprises a phase grating.

16. Apparatus as defined by claim 15 wherein said means for generating a plurality of ordered images further comprises a lens in conjunction with said phase grating.

17. Apparatus as defined by claim 15 wherein said phase shift means is operative to impart a phase shift to the zero order.

18. Apparatus as defined by claim 15 wherein said collecting means is operative to collect said phase shifted ordered image and a plurality of other ordered images.

19. Apparatus as defined by claim 1 wherein said phase shift means comprises a phase retarding plate.

20. Apparatus as defined by claim 1 further comprising stop means adapted to block predetermined higher ordered images.

21. Apparatus as defined by claim 1 wherein said stop means blocks ordered images higher than the first order.

22. Apparatus as defined by claim 1 wherein said means for collecting comprises a focusing lens.

23. Apparatus as defined by claim 22 wherein said collecting means is operative to collect said phase shifted ordered image and a plurality of other ordered images.

24. Apparatus as defined by claim 1 wherein said collecting means is operative to collect said phase shifted ordered image and a plurality of other ordered images.

25. Apparatus as defined by claim 1 further comprising means for effecting wavelength-dependent spatial displacement of said optical radiation.

26. Apparatus as defined by claim 25 wherein said means for effecting wavelength-dependent spatial displacement comprises a dispersion element.

27. A method of processing optical radiation representative of a scene to generate a processed image having periodic spatial amplitude modulations, comprising the steps of:
    generating a plurality of ordered images of the scene, at least one of said ordered images being out of phase with respect to the other ordered images;
    imparting a phase shift to said at least one ordered image so that it is substantially in phase with respect to said other ordered images; and
    collecting said ordered images to obtain the processed image.

28. A method as defined by claim 27 wherein said plurality of ordered images are substantially non-overlapping.

29. A method as defined by claim 28 wherein the phase shift is imparted to the zero order.

30. A method as defined by claim 29 wherein said phase shift is about $\pi$ radians.

31. A method as defined by claim 27 wherein the phase shift is imparted to the zero order.

32. A method as defined by claim 27 wherein said phase shift is about $\pi$ radians.

33. A method as defined by claim 27 further comprising the step of blocking predetermined ones of the higher order images.

34. Apparatus for receiving optical radiation representative of a scene and for generating a processed image having periodic spatial amplitude modulations, comprising:
    a lens located at a first imaging plane and disposed to receive said optical radiation;
    a phase grating positioned adjacent said lens;
    a phase retarding plate spaced from said lens and phase grating, a plurality of substantially non-overlapping ordered images of the scene being formed at said phase retarding plate; and
    a second lens positioned adjacent said phase retarding plate and operative to image said grating at a further plane so as to produce said processed image.

35. Apparatus as defined by claim 34 wherein said phase grating has a duty cycle of about 25%.

36. Apparatus as defined by claim 35 wherein said phase retarding plate is operative to impart a phase shift to the zero order.

37. Apparatus as defined by claim 34 wherein said phase retarding plate is operative to impart a phase shift to the zero order.

38. Apparatus as defined by claim 34 further comprising stop means positioned adjacent said phase retarding plate for blocking higher ordered images.

39. Apparatus as defined by claim 34 further comprising means for effecting wavelength-dependent spatial displacement of said optical radiation.

40. Apparatus as defined by claim 39 wherein said means for effecting wavelength-dependent spatial displacement comprises a dispersion element.

41. Apparatus as defined by claim 34 further comprising a dispersion element disposed in the path of said optical radiation.

42. Apparatus as defined by claim 41 wherein said dispersion element is disposed between said second lens and said further plane.

43. Apparatus for receiving input radiation from a scene and for generating a representation of said scene having periodic spatial modulations, comprising:
   means responsive to said radiation for generating a plurality of ordered images;
   means for imparting a phase shift to at least one ordered image so that it is substantially in phase with the other ordered images; and
   means for collecting said at least one phase shifted ordered image and at least another ordered image to obtain the representation.

44. Apparatus as defined by claim 43 wherein said plurality of ordered images are substantially non-overlapping.

45. Apparatus as defined by claim 43 further comprising means for effecting wavelength-dependent spatial displacement of said optical radiation.

46. Apparatus as defined by claim 45 wherein said means for effecting wavelength-dependent spatial displacement comprises a dispersion element.

* * * * *